(12) United States Patent
Fujii (10) Patent No.: US 6,866,279 B2
(45) Date of Patent: Mar. 15, 2005

(54) METHOD AND APPARATUS FOR CONTROLLING A BICYCLE TRANSMISSION

(75) Inventor: Kazuhiro Fujii, Kawachinagano (JP)

(73) Assignee: Shimano, Inc., Sakai (JP)

(*) Notice: Subject to any disclaimer, the term of this patent is extended or adjusted under 35 U.S.C. 154(b) by 7 days.

(21) Appl. No.: 10/650,183

(22) Filed: Aug. 27, 2003

(65) Prior Publication Data

US 2004/0051273 A1 Mar. 18, 2004

Related U.S. Application Data

(62) Division of application No. 10/267,535, filed on Oct. 8, 2002.

(30) Foreign Application Priority Data

Oct. 15, 2001 (JP) ........................................ 2001-316509

(51) Int. Cl.[7] .............................................. B62M 1/02
(52) U.S. Cl. .......................................... 280/260; 474/69
(58) Field of Search ................................ 280/259, 260, 280/261; 474/69, 70

(56) References Cited

U.S. PATENT DOCUMENTS

| | | |
|---|---|---|
| 4,490,127 A | 12/1984 | Matsumoto et al. |
| 5,059,158 A | 10/1991 | Bellio et al. |
| 5,599,244 A | 2/1997 | Ethington |
| 6,047,230 A | 4/2000 | Spencer et al. |
| 6,367,833 B1 | 4/2002 | Horiuchi |
| 2003/0160420 A1 | 8/2003 | Fukuda |

FOREIGN PATENT DOCUMENTS

JP    7-229909 A    8/1995

*Primary Examiner*—Kevin Hurley
(74) *Attorney, Agent, or Firm*—James A. Deland (57) ABSTRACT

An apparatus for controlling upshifting and downshifting of a bicycle transmission includes a running condition detecting mechanism that detects a running condition of the bicycle, a threshold value setting mechanism that sets at least one of an upshift threshold value and a downshift threshold value for the running condition, and a control mechanism. The control mechanism provides a signal that commands at least one of an upshift and a downshift when the running condition is beyond the corresponding upshift threshold value and downshift threshold value for a first predetermined time interval. In another embodiment, the control mechanism provides a signal that commands at least one of an upshift and a downshift when the running condition is beyond the corresponding one of the upshift threshold value and the downshift threshold value at both a first detection and a second detection, wherein the second detection occurs after the first detection. The control mechanism provides the signal after the second detection and not in a time interval between the first detection and the second detection.

16 Claims, 11 Drawing Sheets

|  | SPEED STEP | UPSHIFT THRESHOLD (U) (km/h) | DOWNSHIFT THRESHOLD (D) (km/h) |
|---|---|---|---|
| A1 MODE | 1 | 13 | 0 |
|  | 2 | 16 | 12 |
|  | 3 | 19 | 14 |
|  | 4 | 255 | 17 |
| A2 MODE | 1 | 11 | 0 |
|  | 2 | 14 | 10 |
|  | 3 | 17 | 12 |
|  | 4 | 255 | 15 |

|  | GEAR SHIFT STEP | UPSHIFT THRESHOLD (U) (rpm) | DOWNSHIFT THRESHOLD (D) (rpm) |
|---|---|---|---|
| A1 MODE | 1 | 75 | 0 |
|  | 2 | 75 | 55 |
|  | 3 | 75 | 55 |
|  | 4 | 255 | 55 |
| A2 MODE | 1 | 70 | 0 |
|  | 2 | 70 | 50 |
|  | 3 | 70 | 50 |
|  | 4 | 255 | 50 |

METHOD AND APPARATUS FOR CONTROLLING A BICYCLE TRANSMISSION

CROSS REFERENCE TO RELATED APPLICATIONS

This application is a division of copending application Ser. No. 10/267,535, filed Oct. 8, 2002.

BACKGROUND OF THE INVENTION

The present invention is directed to bicycles and, more particularly, to various features of an electronically controlled bicycle transmission.

Bicycle transmissions usually comprise either internally mounted transmissions or externally mounted transmissions. Internally mounted transmissions usually are built into the hub of the rear wheel, and externally mounted transmissions usually have a derailleur for switching a chain among a plurality of sprockets. A shift control device mounted to the bicycle frame and connected to the transmission by a shift control cable usually controls both types of transmissions.

The shift control device frequently comprises a shift lever mounted to the handlebars, and in many cases the shift lever is positioned close to the brake lever. The shifting operation is difficult when decelerating because it becomes necessary to operate the brake lever and the shift lever at the same time. For this reason, an automatic shift control device has been developed that automatically shifts gears (speed steps) in response to the bicycle's running conditions (e.g., wheel speed or crank revolutions).

Conventionally, bicycle wheel speed has been detected using a magnet mounted on the bicycle wheel and a reed switch mounted to the bicycle frame. The reed switch produces one pulse per wheel revolution, and the wheel speed may be determined from the interval between detected pulses and the wheel diameter. The automatic shift control device sets an upshift threshold value and a downshift threshold value for each speed step. The bicycle transmission upshifts to the next higher speed step when the detected speed exceeds the upshift threshold value. If the detected wheel speed subsequently falls below the downshift value, then the bicycle transmission downshifts back to the original speed step. Sometimes the upshift threshold value for a particular speed step is set to a slightly higher value than the downshift threshold value of the next higher speed step to create a well known hysteresis effect that minimizes chatter from frequent gear shifting when the wheel speed hovers around the shift points.

Chattering is prevented easily with the above technique when wheel speed is detected at relatively low frequencies such as one pulse per wheel revolution, since shift timing is controlled according to the different speeds set for upshifting and downshifting. But if, for example, attaching several magnets circumferentially around the bicycle wheel increases the wheel speed detection frequency per revolution, meaningless gear shifting may occur frequently. More specifically, if irregular crank revolutions occur while cycling up an incline, within a very short period of time a change might occur in which the wheel speed approaches the upshift threshold value so that the bicycle transmission upshifts against the rider's wishes, and immediately this is followed by a downshift. When such shifting actions occur repetitively, the pedal force required to maintain the desired speed changes frequently, thus causing the rider to pedal in a jerky fashion and reduce the stability of the ride.

SUMMARY OF THE INVENTION

The present invention is directed to features of an automatic bicycle transmission that contribute to a reduction of some undesirable characteristics of known bicycle transmissions. In one embodiment of the present invention, an apparatus is provided for controlling upshifting and downshifting of a bicycle transmission. The apparatus comprises a running condition detecting mechanism that detects a running condition of the bicycle, a threshold value setting mechanism that sets at least one of an upshift threshold value and a downshift threshold value for the running condition, and a control mechanism. The control mechanism provides a signal that commands at least one of an upshift and a downshift when the running condition is beyond the corresponding upshift threshold value and downshift threshold value for a first predetermined time interval.

In another embodiment of the present invention, the apparatus again comprises a running condition detecting mechanism that detects a running condition of the bicycle, a threshold value setting mechanism that sets at least one of an upshift threshold value and a downshift threshold value for the running condition, and a control mechanism. The control mechanism provides a signal that commands at least one of an upshift and a downshift when the running condition is beyond the corresponding one of the upshift threshold value and the downshift threshold value at both a first detection and a second detection, wherein the second detection occurs after the first detection. The control mechanism provides the signal after the second detection and not in a time interval between the first detection and the second detection.

Additional inventive features will become apparent from the description below, and such features may be combined with the above features to provide additional inventions.

DETAILED DESCRIPTION OF THE EMBODIMENTS

Figure 1:
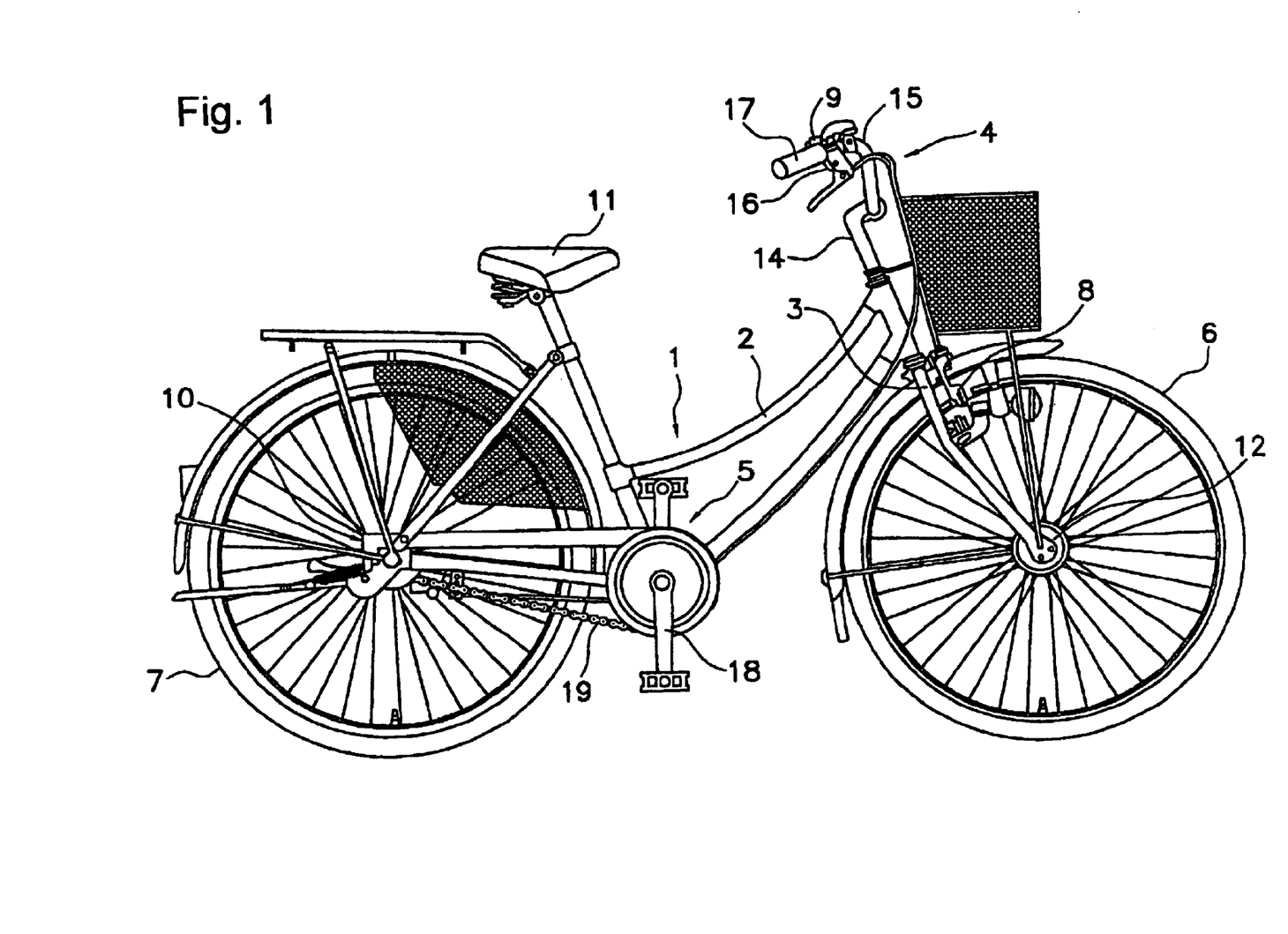
FIG. 1 is a side view of a bicycle that includes an embodiment of an automatically controlled bicycle transmission.

FIG. 1 is a side view of a bicycle that includes a particular embodiment of an automatically controlled bicycle transmission. The bicycle comprises a frame 1 having a double-loop-shaped frame body 2, a saddle 11, a front fork 3, a handlebar part 4, a driving part 5, a front wheel 6 in which is installed a hub generator 12, a rear wheel 7 in which is installed an internal gear changing hub 10, and front and rear brake devices 8 (only the front brake device is shown in the drawing). The handlebar part 4 has a handlebar stem 14, which is fixed to an upper part of the front fork 3, and a handlebar 15 fixed to the handlebar stem 14. Brake levers 16 and grips 17 are installed on the two ends of the handlebar 15. Brake levers 16 operate the brake devices 8.

Figure 2:
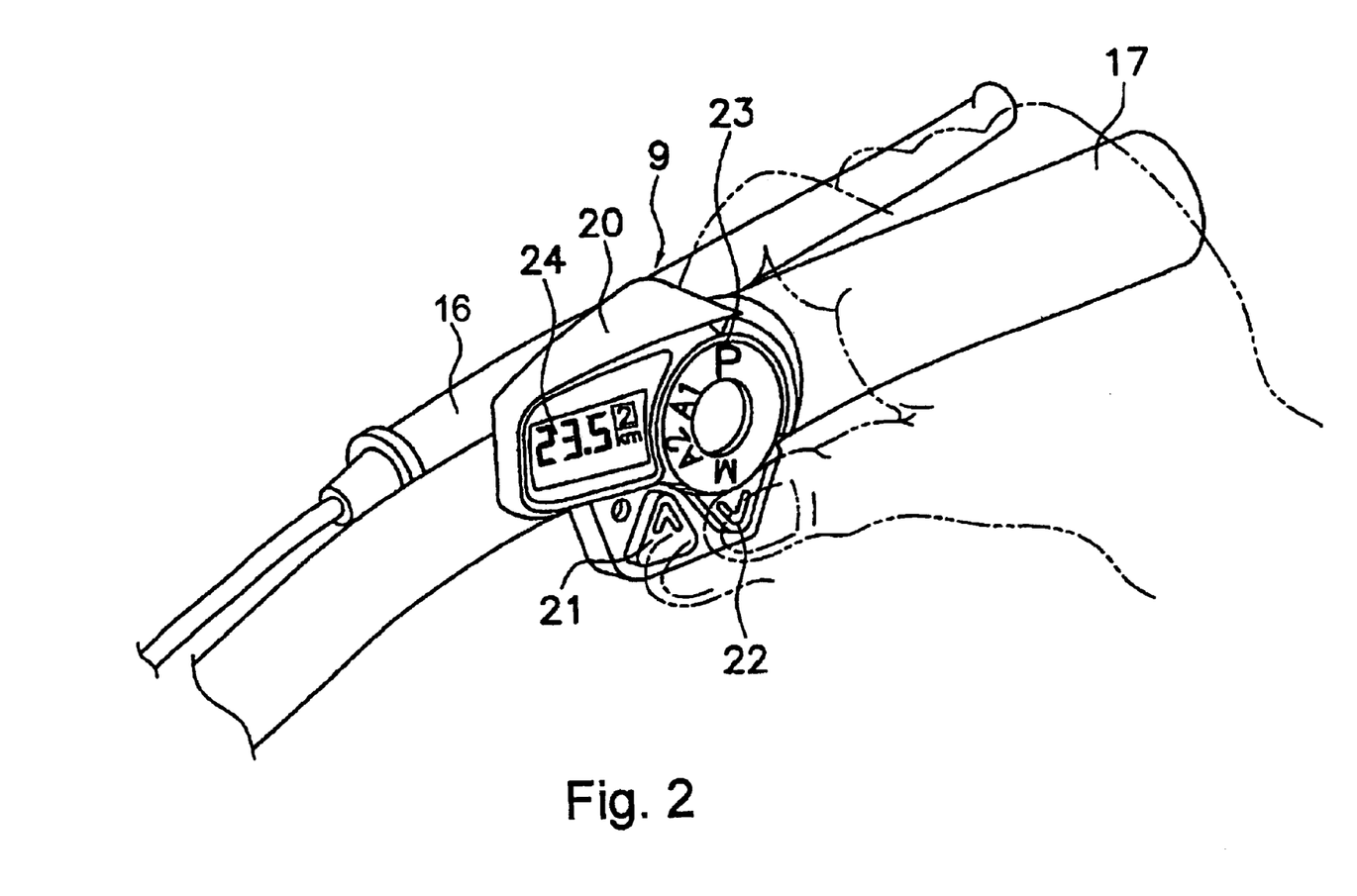
FIG. 2 is a detailed view of a particular embodiment of a handlebar mounted component of the bicycle transmission.

A shift operation unit 9 is mounted on the right-side brake lever 16. As shown in FIG. 2, the shift operation unit 9 has a control housing 20 formed integrally with the right-side (front-wheel) brake lever 16, two control buttons 21 and 22 disposed next to each other to the left and right on the lower portion of the control housing 20, a control dial 23 disposed above the control buttons 21 and 22, and a liquid-crystal display component 24 disposed to the left of the control dial 23.

The control buttons 21 and 22 are triangular push buttons. The control button 21 on the left side is a button for performing shifts to a higher speed step from a lower speed step (upshifts), while the control button 22 on the right side is a button for performing shifts to a lower speed step from a higher speed step (downshifts). The control dial 23 is used for switching among three shifting modes and a parking mode (P), and it has four stationary positions: P, A1, A2, and M. The shifting modes comprise an automatic shift 1 (A1) mode, an automatic shift 2 (A2) mode, and a manual shift (M) mode. The parking mode (P) is for locking the internal gear changing hub 10 and controlling the rotation of the rear wheel 7. The automatic shift 1 and 2 modes are for automatically shifting the internal gear changing hub 10 by means of a bicycle speed signal from the hub generator 12. The automatic shift 1 (A1) mode is a shift mode primarily used when automatic shifting is performed on level terrain, and the automatic shift 2 (A2) mode is a shifting mode primarily used when automatic shifting is performed on a hilly road. Accordingly, the shift timing for downshifts in the automatic shift 2 (A2) mode is set ahead of those in the automatic shift 1 (A1) mode, and the shift timing for upshifts is set behind those in the automatic shift 1 (A1) mode. The manual shift mode is for shifting the internal gear changing hub 10 through the operation of the control buttons 21 and 22. The current riding speed is displayed on the liquid-crystal display component 24, as is the current speed step selected at the time of the shift.

Figure 3:
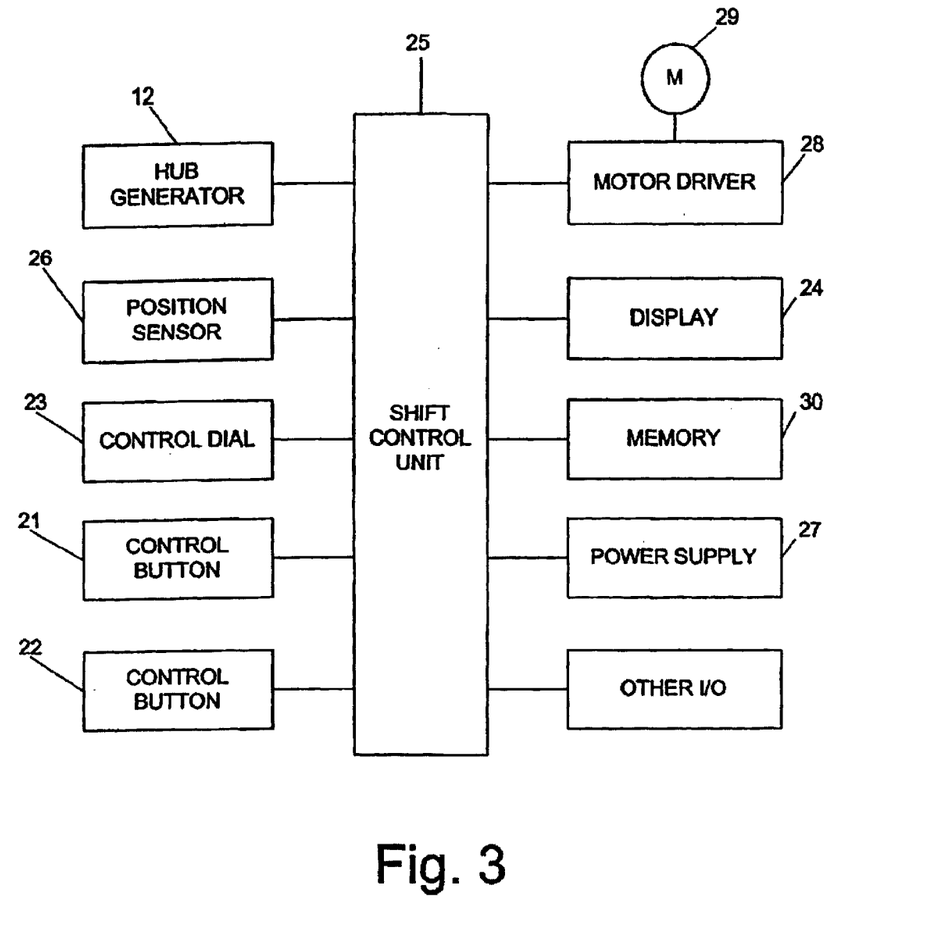
FIG. 3 is a block diagram of a particular embodiment of a shift control device.

A shift control unit 25 (FIG. 3) for controlling shifting operations is housed inside the control panel 20. In general, the shift control unit 25 comprises a microcomputer consisting of a CPU, a RAM, a ROM, and an I/O interface. As shown in FIG. 3, the shift control unit 25 is connected to the hub generator 12, to an actuation position sensor 26 such as a potentiometer that senses the actuation position of the internal shifting hub 10, to the control dial 23, and to the control buttons 21 and 22. The shift control unit 25 also is connected to a power supply 27 (for example, a battery), to a motor driver 28 for driving a motor 29, to the liquid-crystal display component 24, to a memory component 30, and to other input/output components. The memory component 30 may be an EEPROM or another type of rewritable nonvolatile memory. Various types of data, such as passwords, tire diameter or thee like, are stored in the memory component 30. Also stored in memory component 30 are data expressing respective relations between each speed step and the shifting speeds during the automatic shift 1 (A1) mode and the automatic shift 2 (A2) mode. The shift control unit 25 controls the motor 29 according to the various modes, and it also controls the display of the liquid-crystal display component 24.

The hub generator 12 is, for example, a 28-pole AC generator that generates an alternating current signal in response to wheel speed. The shift control unit 25 detects a wheel speed S from the AC signals sent from hub generator 12. Thus, wheel speed S can be detected 28 times per revolution, which results in much greater resolution that wheel speed detected using conventional magnets and reed switches. This permits real-time execution of shift control.

The drive unit 5 comprises a gear crank 18 rotatably supported by the frame body 2, a chain 19 driven by the gear crank 18, and the internal gear changing hub 10. The internal gear changing hub 10 is a four-speed hub having four speed step positions and a lock position, and it is switched by shift motor 29 to the four speed step positions and to the lock position, for a total of 5 positions. As noted above, the lock position restricts the revolution of internal gear changing hub 10.

Figure 4:
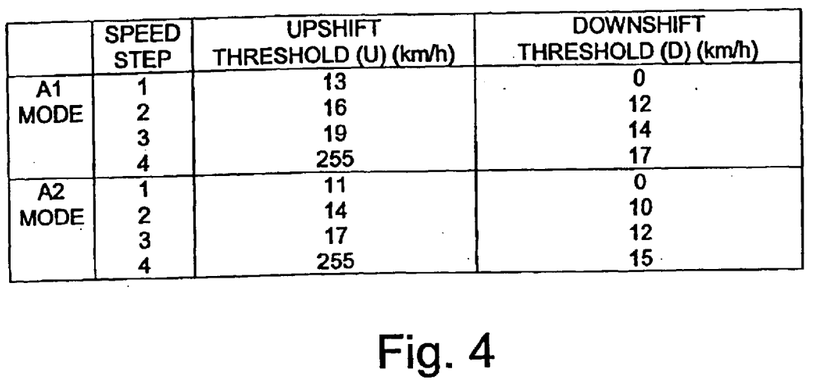
FIG. 4 is a table showing a particular embodiment of upshift and downshift threshold values.

FIG. 4 is a table showing a particular embodiment of upshift and downshift threshold values for automatic shift 1 (A1) mode and automatic shift 2 (A2) mode. More specifically, in this embodiment, the upshift threshold values in automatic shift 1 (A1) mode are 13 km/h (step 1-2), 16 km/hr (step 2-3), and 19 km/h (step 3-4). The downshift threshold values are 12 km/h (step 2-1), 14 km/h (step 3-2), and 17 km/hr (step 4-3). In this embodiment, the upshift threshold values in automatic shift 2 (A2) mode are 11 km/h (step 1-2), 14 km/hr (step 2-3), and 17 km/h (step 3-4). The downshift values are 10 km/h (step 2-1), 11 km/h (step 3-2), and 15 km/hr (step 4-3).

Figure 5:
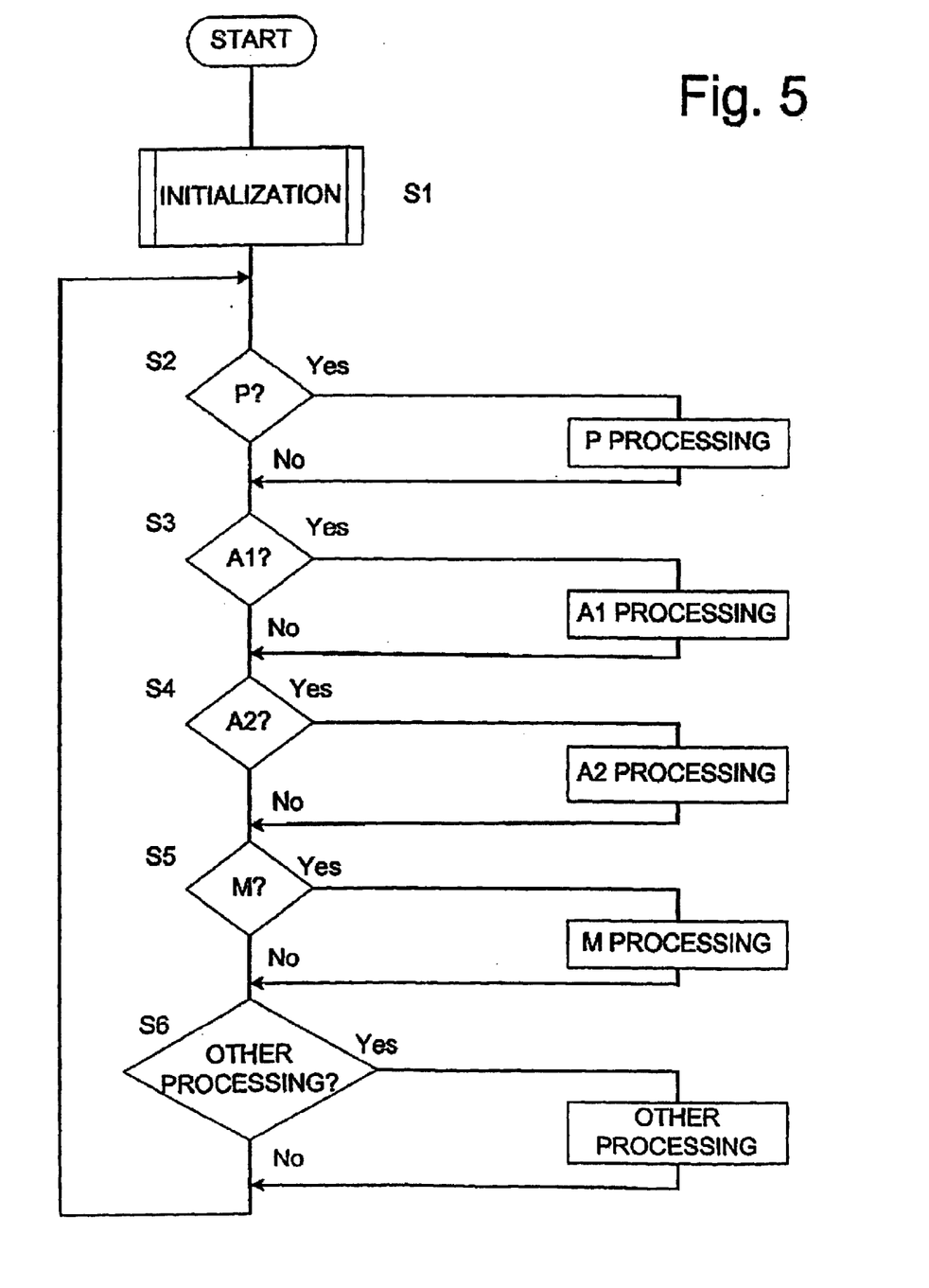
FIG. 5 is a flowchart of a particular embodiment of an algorithm for operating the bicycle transmission.
Figure 6:
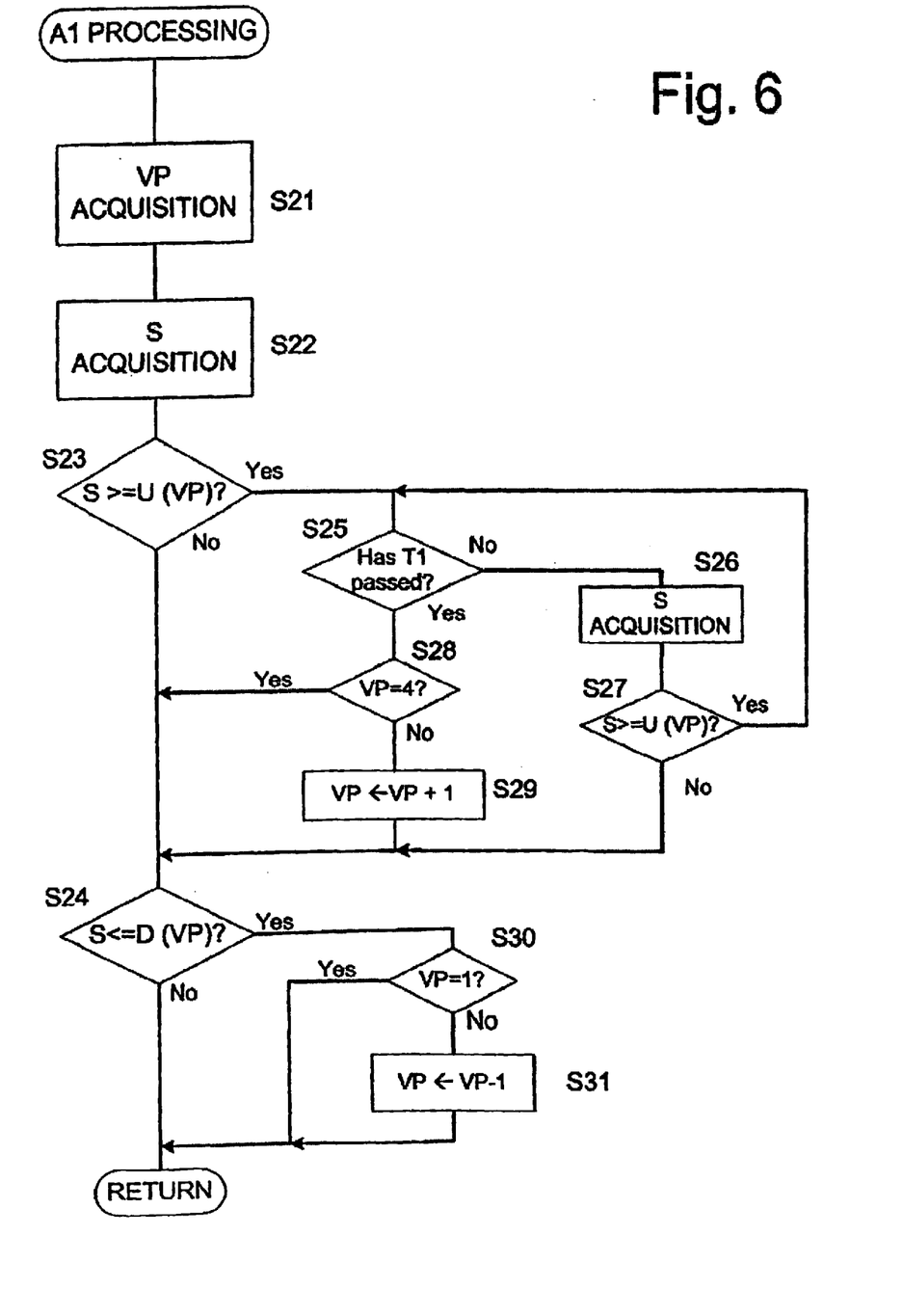
FIG. 6 is a flowchart of a particular embodiment of an algorithm for automatically operating the bicycle tranmission.
Figure 7:
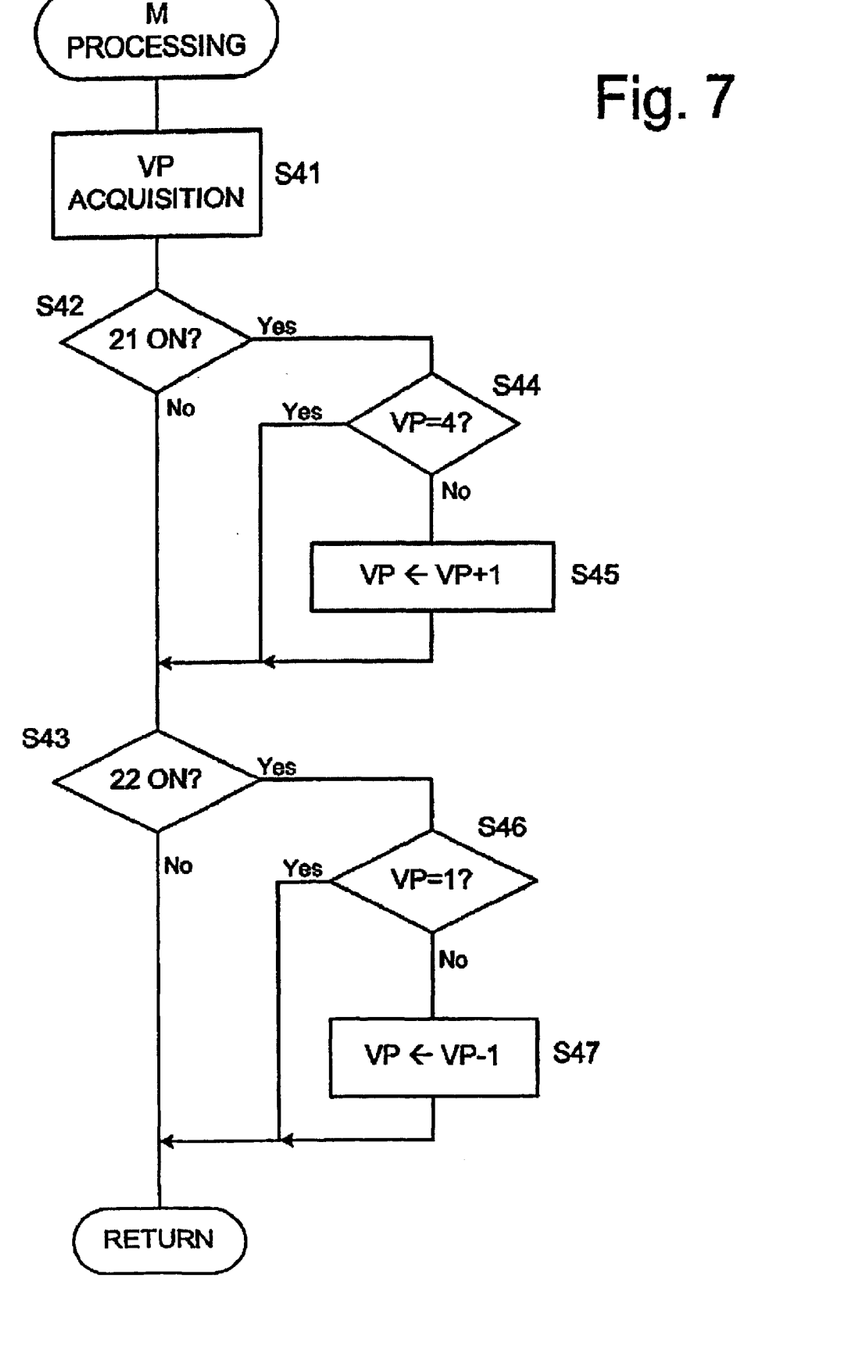
FIG. 7 is a flowchart of a particular embodiment of an algorithm for manually operating the bicycle transmission.

FIGS. 5 through 7 are flowcharts showing a particular embodiment of an algorithm for the operation of shift control unit 25. As shown in FIG. 5, when the power is turned on (start), initialization occurs in step S1. Here, various operating parameters may be set (e.g., that a 26-inch diameter wheel is installed on the bicycle), the current speed step VP is read and set (e.g., to the second speed VP=2) from position sensor 26, and various flags are set. In Step S2, a decision is made about whether or not control dial 23 is set to the parking (P) mode. In Step S3, a decision is made about whether or not control dial 23 is set to the automatic shift 1 (A1) mode. In Step S4, a decision is made about whether or not control dial 23 is set to the automatic shift 2 (A2) mode. In Step S5, a decision is made about whether or not control dial 23 is set to the manual shift (M) mode. In Step S26, a decision is made about whether to select some other process, such as inputting tire diameter, for example.

When the control dial 23 has been turned to the P position and set to the parking (P) mode, then the process moves from Step S2 to Step S7. In Step S7, the parking (P) process is executed. In this process, various routines are executed by operating buttons 21, 22. Such routines may include a password registration routine for registering a password that will clear the locked status of internal gear changing hub 10, or a password input process for inputting and referencing the password for clearing the locked status, and so on. When the control dial 23 has been turned to the A1 position and set to the automatic shift 1 (A1) mode, then the process moves from Step S3 to Step S8 to execute the automatic shift 1 (A1) process shown in FIG. 8. If control dial 23 has been turned to the A2 position and set to the automatic shift 2 (A2) mode, then the process moves from Step S4 to Step S9. In Step S9, an automatic shift 2 (A2) process is executed, similar to the automatic shift 1 process. If the control dial 23 is turned to the M position and set to the manual shift mode, then the process moves from Step S5 to Step S10 to execute the manual shift (M) process shown in FIG. 7. If other processes are selected, the process moves from Step S6 to Step S11, and the selected process is executed.

FIG. 6 is a flowchart illustrating a particular embodiment of the process of Step S8 from FIG. 5. In general, the desired speed step VP of internal gear changing hub 10 is set according to wheel speed S. When the wheel speed S has departed from the desired range, a shift is made in the direction of the closest speed step, one at a time. More specifically, the current speed step VP of internal gear changing hub 10 is acquired from position sensor 26 and stored in Step S21, and the current wheel speed S of the bicycle is acquired from the speed signal from the hub generator 12 and stored in Step S22. In Step S23, a decision is made whether or not the current wheel speed S is greater than the upshift threshold value U (VP) for the current speed step VP as set forth in the table shown in FIG. 4. In Step S24, a decision is made whether or not the current wheel speed S is less than the downshift threshold value D (VP) for the current speed step VP as set forth in the table shown in FIG. 4.

When the current wheel speed S exceeds the upshift threshold value U (VP) for the current speed step, the process moves from Step S23 to Step S25. For example, when VP=2 (second gear), the process moves from Step S23 to Step S25 whenever the wheel speed S is greater than 16 km/h. In Step S25, a decision is made whether or not a time interval T1 has passed since the decision at Step S23. If not, the wheel speed S is acquired again in Step S26. In Step S27, a decision is made as to whether the reacquired current wheel speed S exceeds the upshift threshold value U (VP) for the current speed step. If wheel speed S does not exceed the upshift threshold value U (VP), the process moves to Step S24 to cancel the potential upshift operation. On the other hand, if the wheel speed S still exceeds the upshift threshold value U (VP) in Step 27, then the process returns to Step S25, where again a decision is made as to whether the time interval T1 has passed since the decision at Step S23.

If it is determined in Step 25 that time interval T1 has passed since the decision in Step S23, then the process moves from Step S25 to Step S28, where a decision is made whether or not the current speed step is equal to four. If so, since internal gear changing hub 10 has only four speed steps, then the process will flow to Step S24 without doing anything. However, note that the upshift threshold value for speed step four has been set at the normally unthinkable level of 255, so normally the process does not advance as far as this routine. At speed steps below step four, the process moves to Step S29 wherein VP is incremented by one, shift control unit 25 commands motor 29 to upshift internal gear changing hub 10 by one speed step, and the process continues in Step S24.

If the current wheel speed S is less than the downshift threshold value D (VP) for the current speed step shown in the table in FIG. 4, then the process moves from Step S24 to Step S30. For example, when VP=2, the process moves from Step S24 to Step S30 whenever the wheel speed S is below 12 km/h. In Step S30, a decision is made whether or not the current speed step is equal to one. If so, nothing further is done and the process returns to the main routine. If the current speed step is step two or greater, then the process moves to Step S31 wherein VP is decremented by one, shift control unit 25 commands motor 29 to downshift internal gear changing hub 10 by one speed step, and the process returns to the main routine.

The explanation for Step S9 in FIG. 5, the automatic shift 2 (A2) process, will be omitted because the details of that process are identical to those for the automatic shift 1 (A1) process, with the exception that the threshold values are different.

FIG. 7 is a flowchart of a particular embodiment of an algorithm for manually operating the bicycle transmission (Step S10 in FIG. 5). In Step S10, shifting is done one step at a time using control buttons 21 and 22. In Step S41, the operating position VP is acquired and stored from position sensor 26. In Step S42, a decision is made whether or not control button 21 has been operated or not. In Step S43, a decision is made to whether or not control button 22 has been operated or not. If control button 21 has been operated, the process moves from Step S42 to Step S44, where a decision is made whether or not the current speed step VP is equal to four. If the current speed step VP is not equal to four, then the process moves to Step S45 wherein VP is incremented by one and shift control unit 25 commands motor 29 to upshift internal gear changing hub 10 by one speed step to the next higher step. If the current speed step VP equals 4, then this process is skipped. When control button 22 is operated, the process moves from Step S43 to Step S46, where a decision is made whether or not the current speed step VP is equal to one. If the current speed step VP is not equal to one, the process moves to Step S47 wherein VP is decremented by one and shift control unit 25 commands motor 29 to downshift internal gear changing hub 10 by one speed step to the next lower step. If the current speed step VP equals one, then this process is skipped.

Figure 8A:
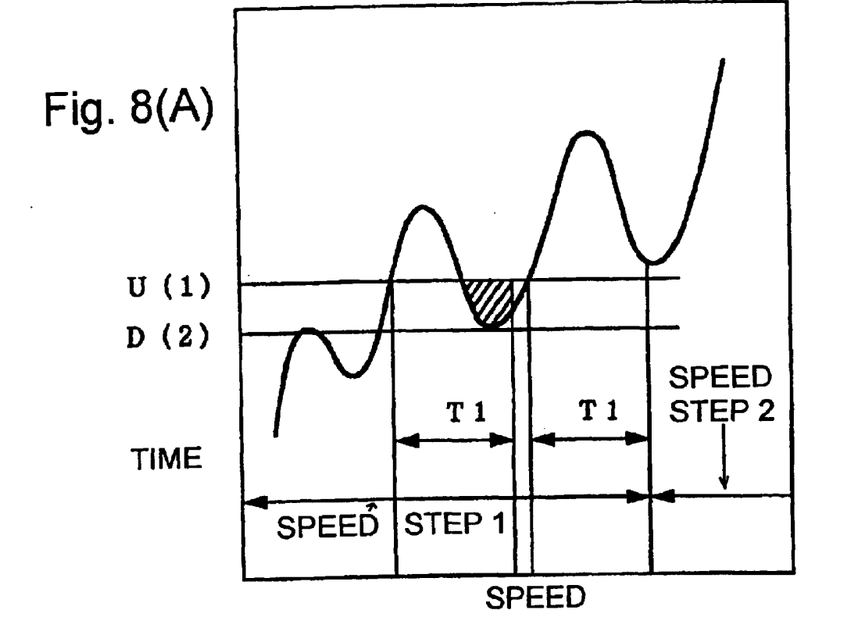
FIGS. 8(A) and 8(B) are graphs showing relationships between speed steps and wheel speed.
Figure 8B:
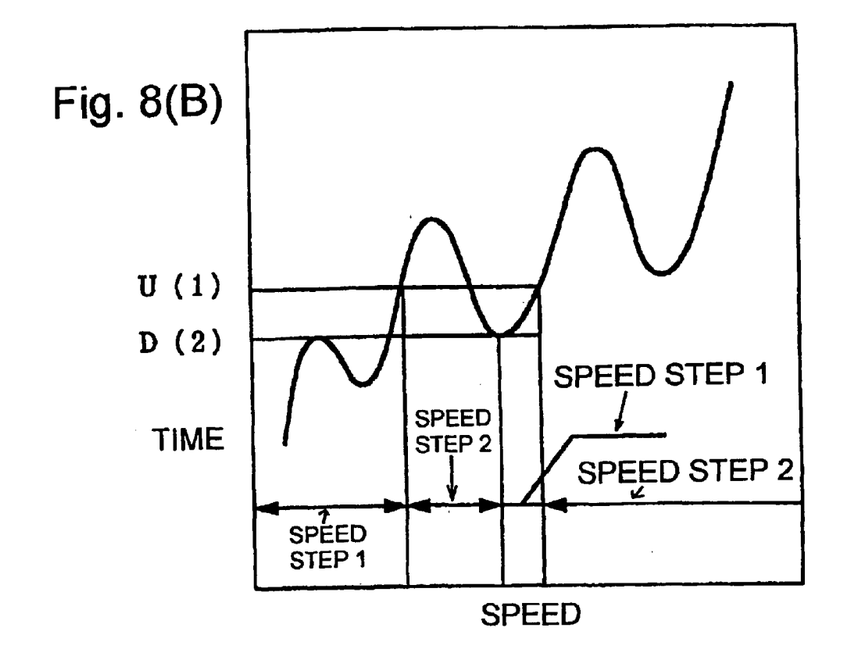

FIGS. 8(A) and 8(B) are graphs that compare an example of the bicycle gear shift operation using the teachings discussed herein (FIG. 8(A)) with that of a conventional example (FIG. 8(B)). In FIGS. 8(A) and 8(B), speed is shown on the vertical axis and time is shown on the horizontal axis. In the case of automatic shift 1 (A1) processing, as shown in FIG. 8(A), if the current speed step is one, for example, and the upshift threshold value U (1) is exceeded (e.g., 13 km/h), a determination will be made in Step S27 in FIG. 6 that the upshift threshold value U (1) has been exceeded during the predetermined time interval T1. However, the hatching in FIG. 8(A) indicates a region where the wheel speed S does not exceed the upshift threshold value U (1), which results in a decision of "No" in Step S27 of FIG. 6. When this occurs, the potential upshift from speed step one to speed step two is cancelled, and no upshift occurs.

If the wheel speed S again exceeds upshift threshold value U (1), and if this threshold value U (1) is exceeded for the entire time interval T1, then the decision from Step S27 will be "yes" for the entire time interval T1. Similarly, the decision from Step S25 will be "yes" after time interval T1 passes, and an upshift will be executed in Step S29 from speed step one to speed step two.

However in the case of the prior art, as shown in FIG. 8(B), whenever the wheel speed exceeds the upshift threshold value U (1), the transmission upshifts to speed step two, and whenever the wheel speed falls below the downshift threshold value D (2) (e.g., 12 km/h), the transmission downshifts again to speed step one. When the wheel speed again exceeds upshift threshold value U (1), the transmission again upshifts, thus bringing about frequent upshifts against the intentions of the rider.

The teachings herein smooth out the gear shifting operation by filtering out transient conditions (using time interval T1) where gear shifting would occur in the prior art. This reduces unnecessary shifting and reduces discomfort on the rider. The teachings herein also produce the unexpected benefit that, by waiting for the passage of time interval T1 before allowing the shifting operation to occur, the actual speed at which upshifting will occur will be faster as acceleration increases. The net effect is a change in the upshift threshold value in response to acceleration, even though the table values remain the same.

In this embodiment, when the wheel speed S is detected to be lower than the downshift threshold value (VP), motor 29 is controlled so that a downshift occurs without delay. This minimizes the burden on the rider, since it is desirable to shift to a lower gear as soon as possible, such as when riding up hills. The effect is further improved when wheel speed is detected frequently, as in the above embodiment.

While the above is a description of various embodiments of inventive features, further modifications maybe employed without departing from the spirit and scope of the present invention. For example, the aforementioned embodiment included an internally mounted gear shifting hub as the gear shift device, but the invention also can be applied to the control of externally mounted gear shifting mechanisms such as those that include multiple sprockets and a derailleur. Also, while the above embodiment used a motor to control the shifting operation, solenoids, electricity, hydraulics, compressed air cylinders, and other actuators can be used to control the gear shifting device.

Figure 9:
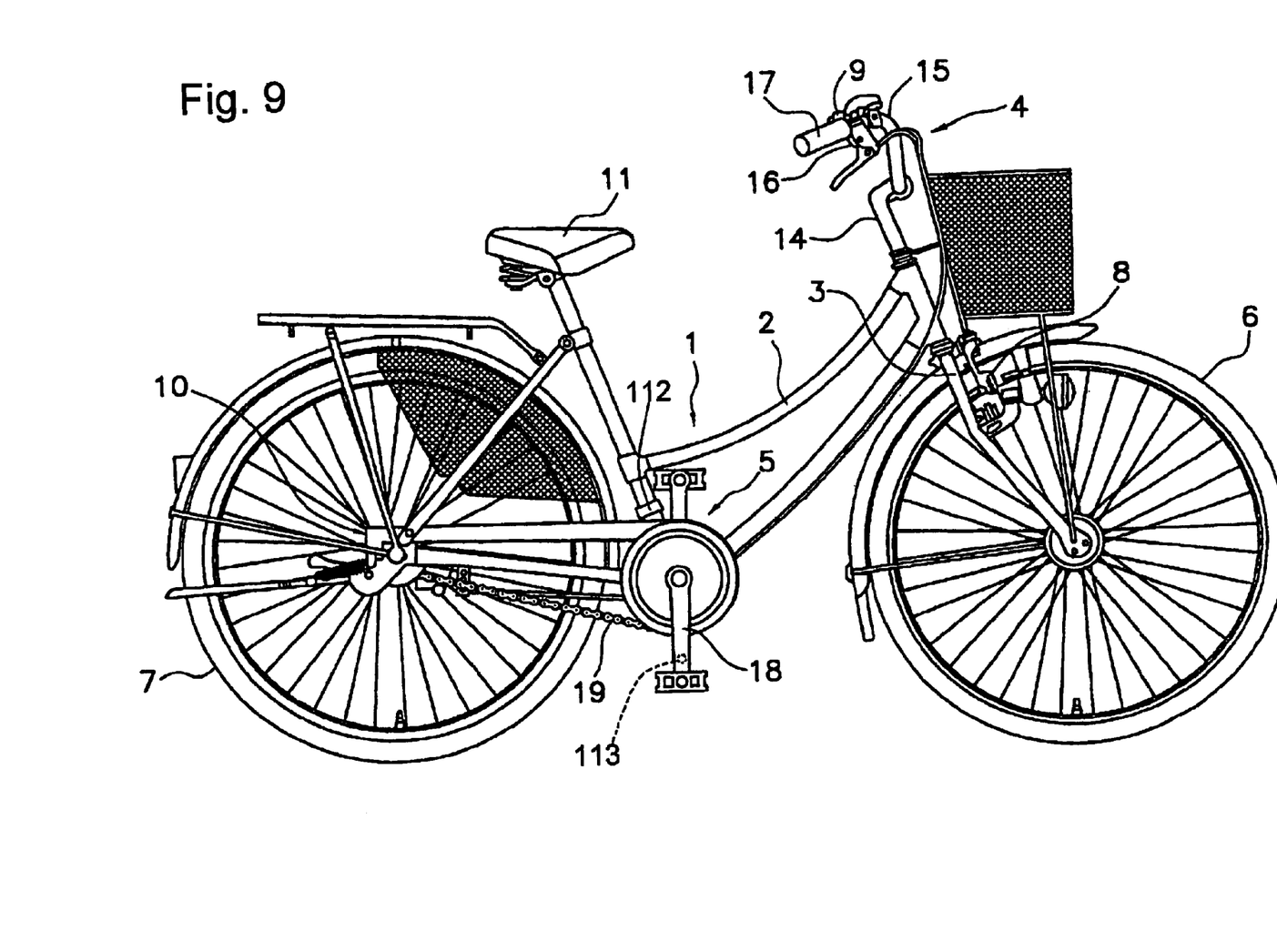
FIG. 9 is a side view of a bicycle that includes an alternative embodiment of an automatically controlled bicycle transmission.
Figure 10:
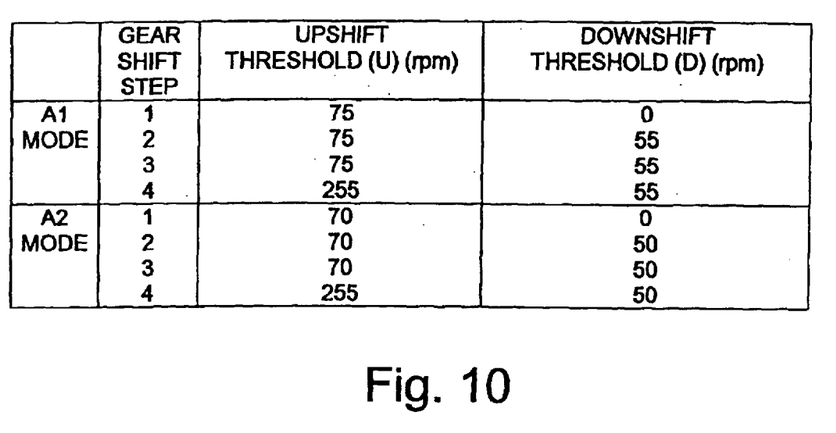
FIG. 10 is a table showing another embodiment of upshift and downshift threshold values.

The above embodiment used wheel speed as the running condition, but it is also possible to use crank revolutions as the running condition. In this case, as shown in FIG. 9, a magnet or other detectable element 113 is mounted on the bicycle's gear crank 18, and a revolution detector 112 comprising, for example, a reed switch for detecting the passage of detectable element 113 is mounted on bicycle frame 2. This arrangement allows the number of crank revolutions to be detected. Several detectable elements 113 may be mounted at intervals along the periphery of gear crank 18. As shown in FIG. 10, the upper and lower threshold values for each speed step may be set in terms of crank revolutions. In FIG. 10, the same values have been set for every speed step, but they may also be different. Processing would be similar to that shown in FIG. 6, with crank revolutions substituted for wheel speed. In other words, when the number of crank rotations is above the upshift threshold value, a decision is made whether or not a predetermined time interval T1 has passed. If the number of crank rotations fall below the upshift threshold value even temporarily (namely, when the pedals are being lightly pumped), the upshift is canceled, and if the number of crank rotations remain above the upshift threshold value (namely, when the pedals are being heavily pumped), the upshift is implemented.

Figure 11:
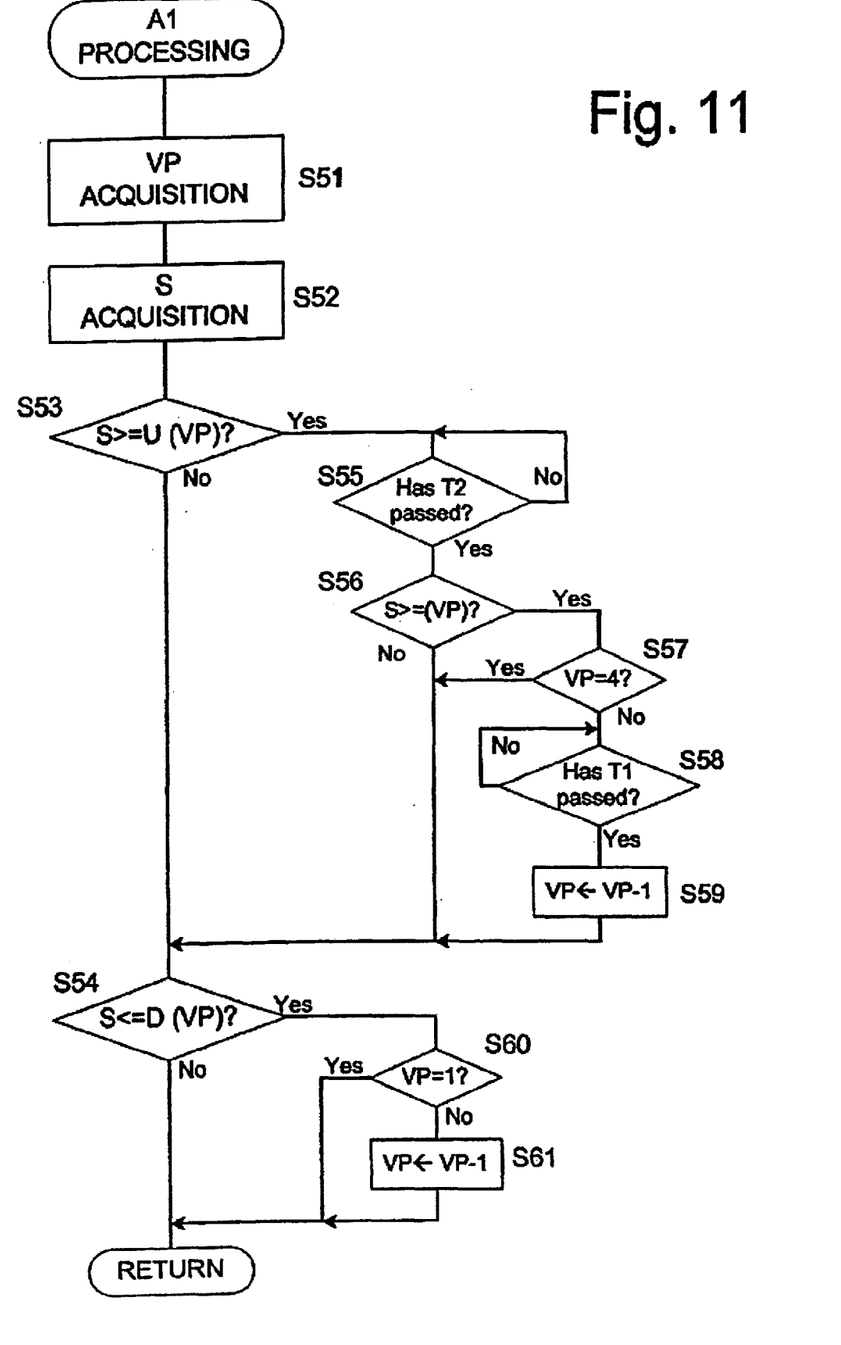
FIG. 11 is a flowchart of an alternative embodiment of an algorithm for automatically operating the bicycle transmission.

The above embodiment included an analysis only over a predetermined time interval T1, but various time intervals could be used in various combinations to produce desirable advantages. For example, it is also possible to analyze the running condition after a predetermined time interval T2 and then determine whether or not to upshift based on the detection results. FIG. 11 is a flowchart of such an embodiment. In this embodiment, the current speed step and wheel speed are acquired and stored in Steps S51 and S52, as was done in Steps S21 and S22 in FIG. 6. If it is ascertained in step S53 that the current wheel speed S is greater than the upshift threshold value U (VP) (e.g., 16 km/h according to the table shown in FIG. 4) for the current speed step (e.g., VP=2), then the process moves from Step S53 to Step S55.

In Step S55, the process is delayed until a predetermined time interval T2 passes. In this embodiment, T2 is less than T1. Once the predetermined time interval T2 has passed, the process moves to Step S56, where again a decision is made whether or not the upshift threshold value U (VP) is exceeded by the wheel speed S. If the wheel speed S is less than the upshift threshold value U (VP), then the process moves to Step S54, and the potential upshift operation is canceled. If the wheel speed S exceeds the upshift threshold value U (VP), then the process moves to Step S57 to determine whether or not the current speed step equals four. If the current speed step equals four, then again nothing is done and the process moves to Step S54. If the current speed step is less than four, then the process moves to Step S58 and waits for the passage of predetermined time interval T1 from the decision of Step S53. When the predetermined time interval T1 has passed, the process moves to Step S59 where VP is incremented by one and shift control unit 25 operates motor 29 to cause internal gear changing hub 10 to upshift by one speed step.

When the current wheel speed S is below the downshift threshold value D (VP) for the current speed step according to FIG. 4, the process moves to Steps S60 and S61 to downshift hub 10 in the same manner as the first embodiment.

In other embodiments, it is also possible to arrange things so that no upshift will be executed unless the average wheel speed or crank revolution value exceeds the upshift threshold value. The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. An apparatus for controlling upshifting and downshifting of a bicycle transmission, wherein the apparatus comprises:

a running condition detecting mechanism comprising a wheel speed detector that detects a running condition of the bicycle;

wherein the wheel speed detector comprises an alternating current generator that rotates with a wheel of the bicycle;

a threshold value setting mechanism that sets at least one of an upshift threshold value and a downshift threshold value for the running condition;

a control mechanism that provides a signal that commands at least one of an upshift and a downshift when the running condition is beyond the corresponding one of the upshift threshold value and the downshift threshold value at both a first detection and a second detection, wherein the second detection occurs after the first detection; and wherein the control mechanism provides the signal after the second detection and not in a time interval between the first detection and the second detection.

2. The apparatus according to claim 1 wherein the second detection occurs a predetermined time interval after the first detection.

3. The apparatus according to claim 1 wherein the signal is provided a predetermined time interval after the second detection.

4. The apparatus according to claim 1 wherein the signal is provided a first predetermined time interval after the second detection, and wherein the second detection occurs a second predetermined time interval after the first detection.

5. The apparatus according to claim 1 wherein the running condition detecting mechanism comprises a crank revolution detector.

6. The apparatus according to claim 1 further comprising an electromotive device adapted to be coupled to the bicycle transmission for operating the bicycle transmission, wherein the electromotive device is operated by the signal from the control mechanism.

7. The apparatus according to claim 1 wherein the threshold value setting mechanism sets an upshift threshold value, and wherein the control mechanism provides a signal that commands an upshift when the running condition is above the upshift threshold value at the second detection.

8. The apparatus according to claim 7 wherein the threshold value setting mechanism sets a downshift threshold value, and wherein the control mechanism provides a signal that commands a downshift when the running condition is below the downshift threshold value at the second detection.

9. The apparatus according to claim 8 wherein the control mechanism immediately provides a signal that commands a downshift when the running condition is below the downshift threshold value at the second detection.

10. The apparatus according to claim 9 wherein the second detection occurs a predetermined time interval after the first detection.

11. The apparatus according to claim 9 wherein the signal is provided a predetermined time interval after the second detection.

12. The apparatus according to claim 9 wherein the signal is provided a first predetermined time interval after the second detection, and wherein the second detection occurs a second predetermined time interval after the first detection.

13. The apparatus according to claim 9 wherein the running condition detecting mechanism comprises a crank revolution detector.

14. The apparatus according to claim 9 further comprising an electromotive device adapted to be coupled to the bicycle transmission for operating the bicycle transmission, wherein the electromotive device is operated by the signal from the control mechanism.

15. An apparatus for controlling upshifting and downshifting of a bicycle transmission, wherein the apparatus comprises:

a running condition detecting mechanism that detects a running condition of the bicycle;

a threshold value setting mechanism that sets at least one of an upshift threshold value and a downshift threshold value for the running condition;

a control mechanism that provides a signal that commands at least one of an upshift and a downshift when the running condition is beyond the corresponding one of the upshift threshold value and the downshift threshold value at both a first detection and a second detection, wherein the second detection occurs after the first detection;

wherein the control mechanism provides the signal after the second detection and not in a time interval between the first detection and the second detection;

wherein the signal is provided a first predetermined time interval after the second detection;

wherein the second detection occurs a second predetermined time interval after the first detection; and wherein the second predetermined time interval is less than the first predetermined time interval.

16. An apparatus for controlling upshifting and downshifting of a bicycle transmission, wherein the apparatus comprises:

a running condition detecting mechanism that detects a running condition of the bicycle;

a threshold value setting mechanism that sets at least one of an upshift threshold value and a downshift threshold value for the running condition;

a control mechanism that provides a signal that commands at least one of an upshift and a downshift when the running condition is beyond the corresponding one of the upshift threshold value and the downshift threshold value at both a first detection and a second detection, wherein the second detection occurs after the first detection;

wherein the control mechanism provides the signal after the second detection and not in a time interval between the first detection and the second detection;

wherein the threshold value setting mechanism sets an upshift threshold value and a downshift value;

wherein the control mechanism provides a signal that commands an upshift when the running condition is above the upshift threshold value at the second detection;

wherein the control mechanism immediately provides a signal that commands a downshift when the running condition is below the downshift threshold value at the second detection;

wherein the signal is provided a first predetermined time interval after the second detection;

wherein the second detection occurs a second predetermined time interval after the first detection; and wherein the second predetermined time interval is less than the first predetermined time interval.

* * * * *